Figure 1:
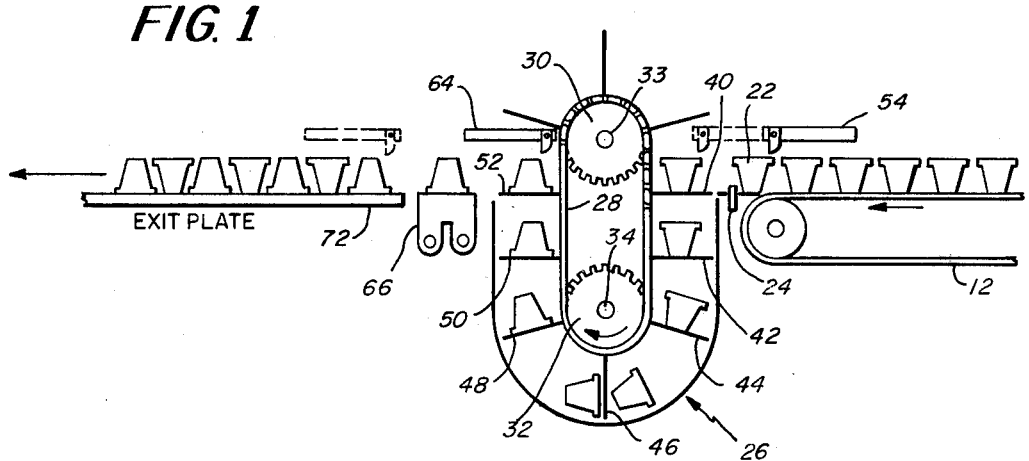

United States Patent [19]

Phipps

[11] 4,067,433
[45] Jan. 10, 1978

[54] PACKAGING MACHINERY
[75] Inventor: Robert E. Phipps, West Campton, N.H.
[73] Assignee: Profile Associates Incorporated, West Campton, N.H.
[21] Appl. No.: 638,179
[22] Filed: Dec. 5, 1975
[51] Int. Cl.² .......................................... B65G 47/24
[52] U.S. Cl. .................................. 198/374; 198/404; 198/419
[58] Field of Search ............... 198/235, 237, 238, 278, 198/279, 283–285, 30, 106, 154, 32, 374, 403, 404, 408, 419, 420, 801; 214/65; 53/143, 161

[56] References Cited
U.S. PATENT DOCUMENTS

| 2,075,012 | 3/1937 | Baker | 198/419 |
|---|---|---|---|
| 2,125,357 | 8/1938 | Peyser | 214/6.5 |
| 2,191,436 | 2/1940 | Bell | 214/6.5 |
| 2,630,951 | 3/1953 | Slightam | 198/30 X |
| 2,764,274 | 9/1956 | Griswold et al. | 198/415 |
| 2,916,133 | 12/1959 | Copping | 198/32 X |
| 2,941,655 | 6/1960 | Wells | 198/154 X |
| 3,143,223 | 8/1964 | McIntyre et al. | 53/143 X |
| 3,245,518 | 4/1966 | Reibel et al. | 198/198 X |
| 3,253,694 | 5/1966 | Kinney | 198/235 |
| 3,499,555 | 3/1970 | Wahle | 198/154 X |
| 3,583,545 | 6/1971 | Hovekamp | 198/30 |
| 3,613,865 | 10/1971 | Reimers | 198/801 |
| 3,640,407 | 2/1972 | Anastasio et al. | 214/6.5 X |
| 3,779,034 | 12/1973 | Morgan | 198/404 |

FOREIGN PATENT DOCUMENTS 511,884 1/1955 Italy ........................ 198/154

Primary Examiner—Evon C. Blunk
Assistant Examiner—Richard K. Thomson
Attorney, Agent, or Firm—Kenway & Jenney

[57] ABSTRACT

Packaging machinery for alternately inverting, collecting and grouping tapered objects in suitable quantities for packaging is disclosed. Two or more lines of containers proceed in parallel, one line remaining upright while an adjacent line is inverted in a turnover unit. Where the tapered objects are containers of products, great care and delicate handling are needed to avoid spillage or leakage. The turnover units accomplish the careful inversion of containers by indexing each container to be inverted through a radial path. Along the path the containers are first supported by carrying plates contacting the bottoms of the containers, then by the member forming the radial path, and finally by succeeding support plates contacting the tops of the containers. The adjacent line or lines of upright containers proceed in parallel with those passing through the turnover unit and a shuttling carriage groups the output of the lines for suitable nesting and arrangement.

6 Claims, 4 Drawing Figures

PACKAGING MACHINERY

BACKGROUND OF THE INVENTION

Automated packaging has become a familiar art and a host of improvements have been made in the saving of manual labor, in careful handling to avoid damage of the good being packaged and in conservation of space, both to protect the packaged items from damage in shipment and to maximize economy in packaging materials. In the case of packaging tapered items, "nesting" of the items, i.e. packing them such that every other item is inverted has been proposed and savings in shipping, warehousing and space-related operations have been effected.

One area of operations where alternate-inverting or nesting of tapered objects can be particularly valuable is in connection with tapered, lidded containers of products such as food or other products subject to the risk of spillage or leakage if mishandling occurs. Available systems are generally costly and complex. Moreover, they lack the capacity to handle products sufficiently gently to avoid damage and spillage. Quite often, the major problem has been the dislodgment of lids from the containers during inversion operations. The present invention is concerned with apparatus capable of packaging tapered objects, particularly lidded containers of products such as food, gently and safely in nested arrangements.

SUMMARY OF THE INVENTION

Although this invention is principally concerned with packaging of tapered, lidded containers, it is applicable to any tapered objects to be packaged in nested fashion. To best exemplify its major features, however the invention is described here as it relates to a preferred embodiment for handling lidded containers. The containers in upright position are carried in parallel lines by conveyor belts. A first line of moving containers is halted at a turnover unit by retractable stops until a descending support plate is in position to receive an upright container from the line. The stops then retract briefly and fingers move a container forward onto a support plate. The stops then rise again to halt movement of the next container.

The container on the support plate is then caused to follow a radial path as the plate is indexed into a U-shaped housing carrying with it the container. Further indexing of the plate causes the container to be gently deposited on its side at the bottom of the contoured housing. The container is then moved and gradually inverted by a succeeding support plate contacting its lid. As the succeeding plate assumes a horizontal position, it finally supports the container in an inverted position at the level of a shuttling carriage.

At the same time, a second parallel line of upright moving containers is moved without inversion toward a plate carriage stop. Additional parallel lines of containers may also be moved in synchronism with the first and second lines. As in the case of the first and second lines, containers from one of the pairs of parallel lines are inverted in similar turnover units and containers from the other of the parallel lines proceed without inversion toward a plate carriage stop. As the stops retract, fingers draw a container from desired lines onto the shuttling carriage, adjacent containers being alternatively upright and inverted.

The carriage may shuttle along a line at right angles to the parallel lines of containers and fingers against draw containers from desired lines onto the plate carriage, adjacent containers again being alternatively upright and inverted. The fingers further act to draw an assembly of containers onto an exit plate for delivery as nested groups to the succeeding operation in any desired multiples.

DRAWING

Figure 2:
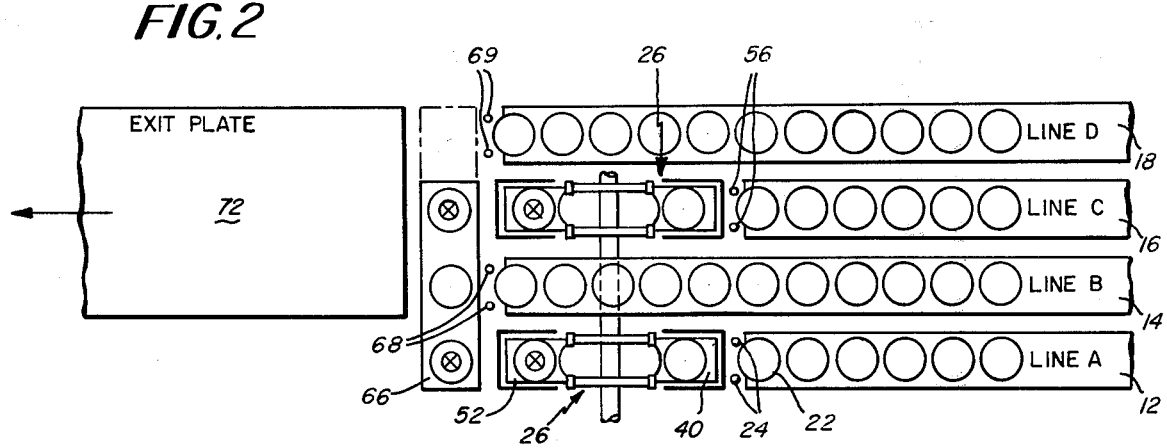
Figure 3:
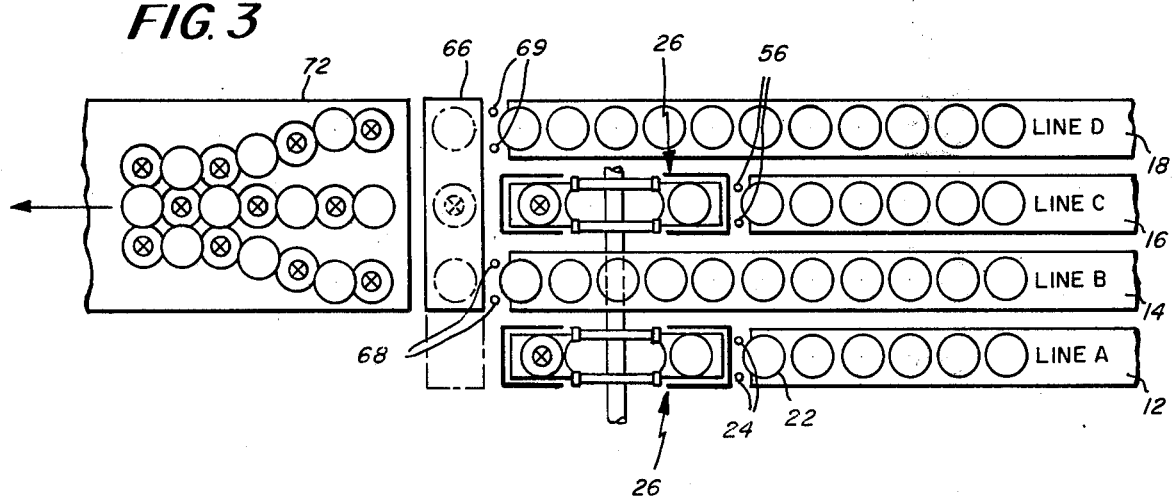
Figure 4:
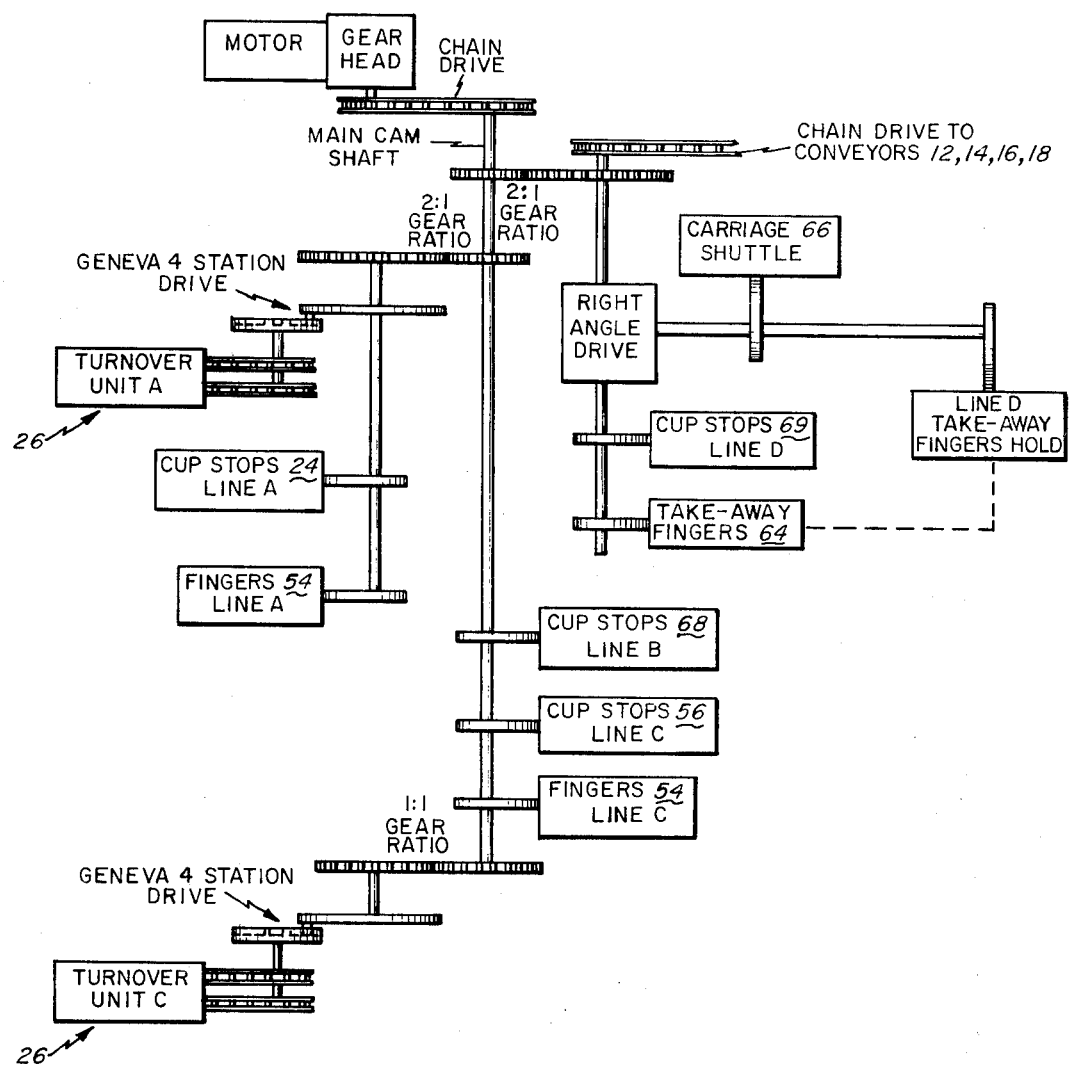

Fig. 1 is a schematic sectional view of a preferred embodiment of the invention emphasizing the turnover mechanism, FIG. 2 is a plan view in which the shuttling carriage is shown in a first position, FIG. 3 is another plan view wherein the shuttling carriage is shown in a second position, and FIG. 4 is a schematic layout of the drive and synchronizing system.

PREFERRED EMBODIMENT

As indicated in the general description above, the number of lines of containers in a matter of choice depending upon the requirements in any given situation. Also, as is noted in greater detail below, the shuttling carriage need not be limited to any particular grouping of lines of containers. However, a convenient arrangement which facilitates understanding of the invention is one involving four parallel lines of containers and, accordingly, it is described as the presently preferred embodiment of the invention. At the outset, it should be noted that in the plan views upright containers are symbolized by blank tops and inverted containers by X-tops.

Considering for the moment the first three views of the drawing, there may be seen four parallel conveyor belts 12, 14, 16 and 18, bearing the legends Line A, Line B, Line C and Line D respectively. On each conveyor belt a line of upright containers is carried in a right-to-left direction as seen in the drawing. The conveyor belts run continuously to maintain quantities of containers in position to be packaged.

Line A, on the belt 12, is shown with a leading container 22 lightly urged by friction with the belt against a retractable stop 24 adjacent the entry to a contoured turnover unit 26. The turnover unit 26 is a generally U-shaped enclosure within which two parallel endless chains 28 are guided by external sprockets 30 and internal sprockets 32. Support plates are rigidly mounted on the chains and are shown in positions 40, 42, 44, 46, 48, 50 and 52 within the housing. Three other support plates are disposed outside the housing adjacent the sprocket 30 as seen in FIG. 1. The support plates are equally spaced in an array and are maintained at right angles to the two parallel chains.

The sprocket 30 is mounted upon a shaft 33 and the sprocket 32 is mounted upon shaft 34. As is conventional a single power source such as an electric motor provides all needed power for the various mechanisms. Synchronization of the various motions described and to be described can be achieved by various common expedients such as cams and cam followers, air cylinders, solenoids or switch and relay combination. One suitable system is described hereinbelow with reference to FIG. 4.

Reverting to the operation of the support plates, however, it is sufficient to note that each index is sufficient only to move a given support plate into the position previously occupied by a preceding plate, the index length therefore being equal to plate spacing.

The plates are of an appropriate size and shape to clear the interior of the contoured housing 26 and to provide support of the continers. The housing 26, at least in its lower portion, is preferably contoured to enclose the plates and containers substantially completely, although parallel curved rods or other members outlining a generally radial path may be employed.

Between indexing motions, the turnover unit is in the REST position as shown in FIG. 1. At that time, reciprocating fingers and retractable stops driven and synchronized through from the basic power source came into play. The finger 54 drops toward Line A and a simiar finger, not shown, drops toward Line C. A stop 24 at Line A and a similar stop 56 at Line C then retract downwardly. The finger 54 moves to the left pushing the container 22 onto the support plate position 40, as indicated by the phantom showing of the finger 54. Similar action takes place simultaneously at Line C but, for brevity, only the operation of Line A will be described in detail.

The stop 24 then rises and the finger 54 rises and returns to its original position. As the line of containers moves forward to bring another container against the stop 24, an index of the turnover unit takes place. The container upon the support plate is then carried to the plate position 42 within the housing. At the next rest position, the cycle is repeated, a new container entering the housing at plate position 40.

Each container is supported upright upon a support plate during the indexed descent into the turnover unit until gravity causes it to tilt gradually toward the interior wall of the housing. Ultimately, as at the plate position 46, contact between the support plate and the bottom of the container is completely lost and the container lies on its side wholly supported by the inner wall of the housing. Then, however, a following or succeeding plate contacts the lid of the container, first pushing it ahead until, as at positions 48 and 50, it alone supports the container in an inverted position. Further indexing of the turnover unit brings the inverted container to a plate position 52 about at the level of its entry into the turnover unit.

During the REST period, fingers 64 also operated from the basic power source draw the container from the plate position 52 onto a shuttling carriage 66. The carriage 66 is in the position shown in FIG. 2, and at the same time the fingers 64 draw the container in Line A from the plate position 52, similar fingers draw an upright container from line B and another inverted container from Line C. To permit such operation, retractable stops 68 descend allowing a single upright container to move from Line B onto the carriage and stops 69 remain in a raised position to prevent a container from leaving Line D.

At the indexing motion, the shuttling carriage 66 moves into the position shown in FIG. 3, carrying with it the three containers from Lines A, B and C. In the following REST period, fingers similar to the fingers 64 draw containers from Lines B, C and D, these containers being upright, inverted and upright respectively. The new group forces the original group ahead (to the left, as illustrated) and at this time, however, the fingers continue to draw all six containers across the shuttling carriage 66 onto an exit plate 72. The exit plate may include converging walls, if desired, to bunch the containers more closely for the next packaging operation to be efficiently conducted.

When all six containers have been pulled in nested array onto the exit plate 72, the shuttling carriage 66 returns to the position shown in FIG. 2 and the entire cycle is repeated.

The action of the various lines is such that Lines A and D deliver a container only on alternate cycles, and, accordingly, Lines B and C use twice as many containers as Lines A and D.

As noted above, any of various drive and synchronizing systems may be employed in the present invention. There has been outlined in FIG. 4 a suitable arrangement. A basic drive motor is connected through a gear head and chain drive to a main cam shaft. A gear shown mounted below the chain drive on the main cam shaft drives a second gear mounted upon an intermediate shaft. The gears are in a 2:1 ratio so that the intermediate shaft is rotated once for every two rotations of the main cam shaft. The intermediate shaft drives the conveyors 12,14, 16 and 18 by means of still another chain drive.

A second intermediate shaft is shown to the left of the main cam shaft to facilitate understanding, although only a single intermediate shaft is needed. A similar 2:1 gear ratio is established and the second intermediate shaft carries a Geneva 4-station drive plate. Thus, for each rotation of the drive plate, the Geneva roller and its associated shaft is turned 90° providing the desired indexing motion to the turnover unit 26 of Line A. The same intermediate shaft provides the motion and timing of the cup stops 24 and the fingers 54 of Line A. The necessary motions may be obtained through cams, cam followers, levers and push rods. Synchronization is derived, of course, by suitably shaped cam lobes. Because the operation of the apparatus is such that some cup stops operate twice as often as other cup stops, the stops 56 in Line C and 68 in Line B are driven directly from the main shaft without the interposition of any gear reduction. Also, timing and synchronization for cup stops in the lines of cups which do not go through turnover units must be different from that of the cups going through the turnover units. Again, suitable gearing and cam lobes provide the appropriate synchronization.

The various fingers for moving cups into the turnover units and for drawing the cups onto the across the shuttling carriage 66 must also be suitably timed. The fingers 54 which load the cups into the turnover unit of Line A are powered by the intermediate shaft shown to the left of the main cam shaft to provide the necessary reciprocating and pivoting operations. Cams with spring-loaded cam followers are utilized to drop the fingers to push a cup forward and lift them on the return stroke.

At the lower end of the main cam shaft is the mechanism for operating the turnover unit of Line C. This mechanism is entirely similar to that operating the turnover unit 26 at Line A except for the fact that the gears are in a 1:1 ratio. Examination of FIGS. 2 and 3 indicates that the cups of Line A are delivered only when the carriage is in the position shown in FIG. 2 whereas cups from Line C are delivered when the carriage is in position shown in FIG. 2 and FIG. 3. Therefore, of course, the turnover unit of Line C is operated on every rotation of the main cam shaft.

Other motions are also derived from the intermediate shaft to the right of the main cam shaft. A right angle 3-way gear unit is driven by the intermediate shaft and has a shaft extending downward to operate the take-away fringers 64 which draw the cups onto the carriage as at carriage 2 and across the carriage to the exit plate 72 as at FIG. 3.

The right angle shaft also extends to the far right to provide motion to the shuttling carriage 66. Becuase it is necessary to prevent the operation of take-away fingers on Line D at every other sequence, one additional motion in is needed to prevent the fingers from attempting to remove a cup from Line D when the carriage is in the position shown in FIG. 2. This motion and operation are indicated by the dotted connection running between the take-away fingers 64 and the Line D hold.

Similar structure is not needed at Line A because the turnover unit in Line A functions only every other time and no cup is presented to be taken away on alternate cycles.

The mechanical outline of FIG. 4 should serve only as an illustration of one of many possible schemes of driving and synchronization. As has been noted, various systems may be substituted to provide the required timing and synchronization. Also, the illustrated 4-line system is merely exemplary. Additional lines or even a single line, the output of which is directed into a number of channels may also be used.

What is claimed is:

1. Packaging machinery for arranging tapered containers having lids in nested groups comprising means for moving said containers in upright positions along generally parallel lines to a delivery point, turnover unit disposed in at least one of said lines but not in others of said line for inverting containers moving in said one of said lines, said turnover unit including members depending downwardy from said one of said lines and defining a substantially enclosed radial path, a plurality of support plates disposed at right angles to said radial path, means for sequentially indexing said plates to predetermined positions along said path, means for moving individual ones of said tapered containers in upright positions from said one of said lines onto one of said support plates, whereby said individual tapered container is lowered along said radial path to rest upon said members adjacent the low point thereof, a following support plate contacting the lid of said container and raising it further along said radial path in inverted position to a point adjacent said delivery point.

2. Packaging machinery as defined in claim 1 wherein said generally parallel lines comprise a first and a third line along which said containers move in upright positions to said delivery point and a second and a fourth line each including one of said turnover units for indexing said containers in inverted positions to said delivery point, said machinery further including a shuttling carriage, means for moving said shuttling carriage first adjacent the delivery point of said first through third lines, means for moving an container from each of said first through third lines onto said carriage, means for moving said shuttling carriage second adjacent the delivery point of said second through fourth lines and means for moving an container from each of said second through fourth lines onto said carriage.

3. Packaging machinery as defined in claim 2 including an exit plate and means for extending the action of said means for moving a container from each of said second through fourth lines to move containers from all of said first through fourth lines from said shuttling carriage onto said exit plate.

4. Packaging machinery as defined in claim 1 including retractable stops dispose and operable in said others of said lines at said delivery point in said lines and means synchronized with said means for withdrawing containers for retracting said stops in predetermined sets of said lines whereby containers are withdrawn only from lines in which said stops are retracted.

5. Packaging machinery as defined in claim 4 and further comprising a carriage shuttling from one rest position to another adjacent said delivery point, said means for withdrawing containers being operative only upon containers in lines at the delivery point of which said shuttling carrige is in an adjacent rest position.

6. Packaging machinery as defined in claim 1 wherein said members defining a radial path comprise a U-shaped housing and further comprising means for driving said support plates in a generally elliptical course passing through said U-shaped housing, said support plates being equally spaced upon said driving means and extending outwardly therefrom whereby each said support plate changes from a horizontal attitude adjacent said one of said lines to a vertical attitude at the bottom of said housing, containers carried by each said support plate thus being deposited adjacent the bottom of said housing, following support plates contacting said lids and raising such containers vertically to said delivery point.

* * * * *